(12) United States Patent
Waragai et al.

(10) Patent No.: US 6,917,451 B2
(45) Date of Patent: Jul. 12, 2005

(54) IMAGE READING APPARATUS (75) Inventors: Tsuyoshi Waragai, Shizuoka (JP);
Yasuyoshi Hayakawa, Shizuoka (JP);
Masayoshi Fukatsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 09/875,194

(22) Filed: Jun. 7, 2001

(65) Prior Publication Data

US 2002/0051256 A1 May 2, 2002

(30) Foreign Application Priority Data

Jun. 8, 2000 (JP) ........................................ 2000-171910

(51) Int. Cl.⁷ ............................ H04N 1/40; H04N 1/04; H04N 1/00
(52) U.S. Cl. ....................... 358/461; 358/408; 358/496; 358/497; 358/498; 358/474
(58) Field of Search ................................ 358/461, 408, 358/496, 497, 498, 474, 483, 482, 505; 382/274, 312, 313; 399/207, 206, 211, 267, 364, 367–374; 355/23, 24; 250/234–236, 208.1

(56) References Cited

U.S. PATENT DOCUMENTS 4,760,609 A * 7/1988 Tamagaki .................... 382/167
4,907,097 A * 3/1990 Sobue ......................... 358/461
6,400,472 B1 * 6/2002 Yoshimizu .................. 358/498

FOREIGN PATENT DOCUMENTS

JP        05022515 A   *  1/1993   .......... H04N/1/028

* cited by examiner

Primary Examiner—Cheukfan Lee
(74) Attorney, Agent, or Firm—Fitzpatrick, Cella, Harper & Scinto

(57) ABSTRACT

An image reading apparatus includes a light transmitting member opposed to an original, a reading device for reading the original image through the light transmitting member, and a standard portion which is read by the reading device to perform shading compensation, wherein the standard portion is provided on the opposite side of the original with respect to the light transmitting member.

6 Claims, 6 Drawing Sheets

IMAGE READING APPARATUS

BACKGROUND OF THE INVENTION

1. Field of the Invention

The present invention relates to an image reading apparatus for reading the image of an original on a light transmitting member through scanning with a reading means, such as a reading unit.

2. Related Background Art

Generally speaking, when reading the image of an original by a conventional image reading apparatus, the following two methods are available.

One of the methods is a stationary original reading method in which the original is set in position on an original glass stand, which serves as the light transmitting member, in a predetermined manner, and in which the original remaining stationary on the original glass stand is scanned by an optical carriage serving as a movable image reading means, whereby the image of the original is read.

The other method is a flowing original reading method in which the original is conveyed at a predetermined speed to be read at a predetermined reading portion where a stationary optical carriage is arranged.

As compared with the former method, i.e., the stationary original reading method, the latter method, i.e., the flowing original reading method, is more advantageous, for example, in that the optical carriage can remain stationary, and there is no need to reciprocate the optical carriage each time reading is to be performed.

Further, as a result of the recent digitization of image reading units for use in copying machines or the like, a single reading suffices where a plurality of copies of an image are to be made, which makes the flowing original reading method most advantageous.

That is, in digital image reading and recording, when a plurality of copies of an image are to be made, the image is read by a single flow reading and can be stored in a digitized form in an amount corresponding to the number of copies required.

Now that it has become possible to store read images in memory, an image reading apparatus is required to be capable of reading images as quickly as possible.

In the conventional technique described above, it is necessary to read a standard white plate for shading compensation at the time of image reading to determine the standard white for the image read.

When this standard white plate has been soiled as a result of the conveyance of originals for reading, it is difficult to correctly perform the cleaning of the standard white plate, so that it is necessary to perform a periodical maintenance or the like on the standard white plate.

SUMMARY OF THE INVENTION

It is an object of the present invention to provide an image reading apparatus in which the standard portion for shading compensation is prevented from being soiled.

Another object of the present invention is to provide an image reading apparatus comprising a light transmitting member to be opposed to an original, reading means for reading the original image through the light transmitting member, and a standard portion which is read by the reading means to perform shading compensation, wherein the standard portion is provided on an opposite side to a side, to which the original is to be opposed, of the light transmitting member.

Further objects of the present invention will become apparent from the following description.

DESCRIPTION OF THE PREFERRED EMBODIMENTS

Preferred embodiments of the invention will now be described in detail by way of example with reference to the accompanying drawings. It should be noted that the sizes, materials, configurations, positional relationships, and so on of the components of these embodiments should not be construed restrictively unless otherwise specified.

(First Embodiment)

Figures 1, 1A, 1B:
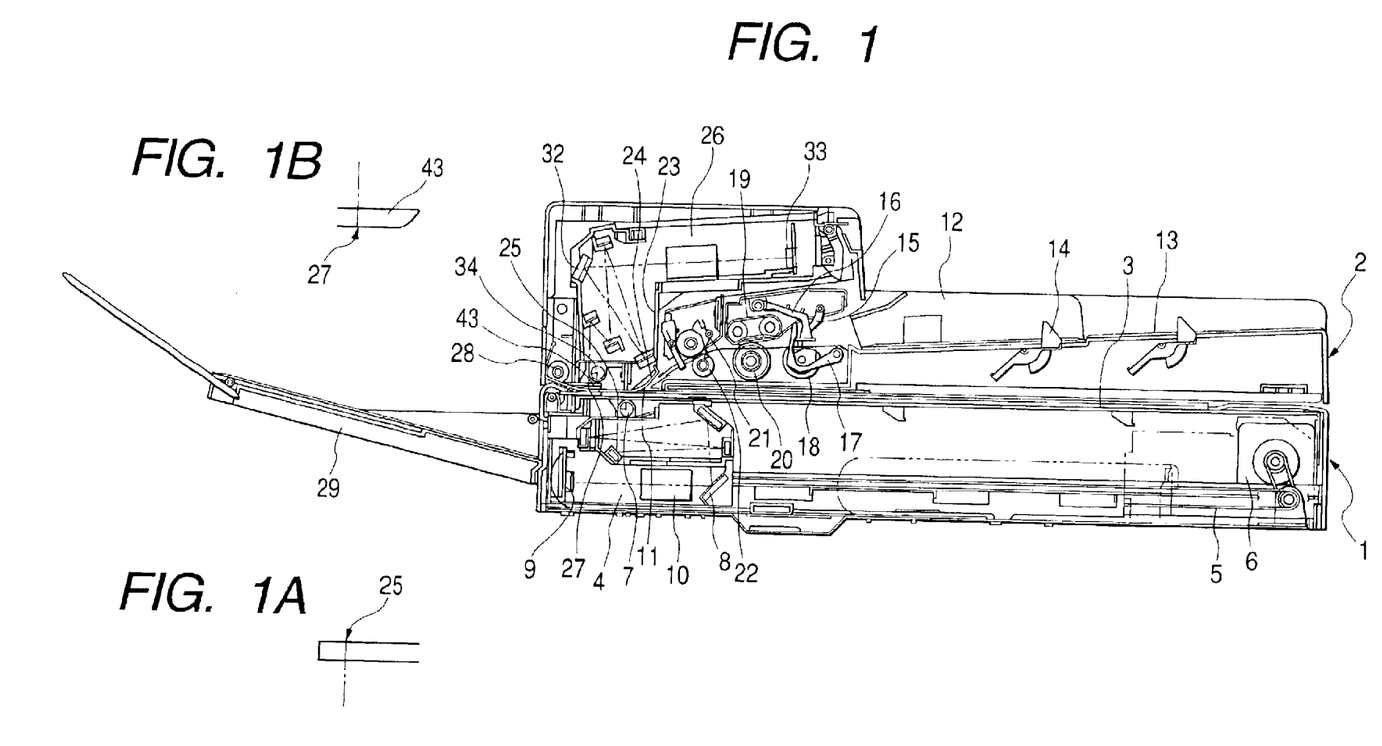
FIG. 1 is a diagram showing an image reading apparatus according to an embodiment of the present invention.
FIG. 1A is an enlarged view of a first reading point.
FIG. 1B is an enlarged view of a second reading point.

FIG. 1 is a diagram most clearly depicting the present invention. A description will now be given with reference to this drawing. Numeral 1 indicates a flatbed image reading portion (FB) capable of reading the image of an original which is stationary or being conveyed. Numeral 2 indicates an ADF (automatic document feeder) mounted on the upper side of the FB 1; it is a device for feeding and conveying loaded originals one by one.

Numeral 3 indicates an original glass stand serving as a first light transmitting member arranged on the upper surface of the FB 1, numeral 4 indicates a first optical carriage serving as a first reading means for scanning an original on the original glass stand 3 to read the original image, numeral 5 indicates a drive belt for transmitting a driving force for moving the first optical carriage 4, numeral 6 indicates a carriage driving motor for driving the drive belt 5, and numeral 7 indicates a lamp arranged atop the first optical carriage 4. The original glass stand 3 bears and supports the original.

Further, in the first optical carriage 4, there are provided a reflection mirror 8 for guiding light of the lamp 7 reflected back from the original to a predetermined optical path, a CCD 9 for converting the image obtained by receiving the light guided by the reflection mirror 8 to an electric signal, and a condenser lens 10 for condensing the light reflected by the reflection mirror 8 on the CCD.

Numeral 11 indicates an original abutment reference plate, provided on the original glass stand 3, against which the original is abutted so that the image of the original is read on the original glass stand 3, numeral 12 indicates an original side regulating plate provided in the ADF 2 and adapted to regulate the original in the widthwise direction, and numeral 13 indicates an original stacking tray.

Numeral 14 indicates an original length detecting lever arranged on the original stacking tray 13 and adapted to detect the length of an original, and numeral 15 indicates an original presence/absence sensor lever for detecting the leading end of an original to thereby detect the presence of the original.

Numeral 16 indicates a weight for pressing the leading end of the original from above, numeral 17 indicates an original shutter for preventing the leading end of the original from entering a separating and feeding portion, numeral 18 indicates a pickup roller for feeding the stacked originals starting with the lowermost one, numeral 19 indicates a separating belt rotated in a direction opposite to a direction in which the original is conveyed, and numeral 20 indicates a feeding roller opposed to the separating belt 19.

Numeral 21 indicates an ante-registration sensor lever which detects the leading end of an original to control the timing with which an original loop is formed, numeral 22 indicates a registration roller pair, numeral 23 indicates an original leading end detecting lever for detecting the leading end of an original conveyed by the registration roller pair 22, and numeral 24 indicates an upper original conveyance guide opposed to the original glass stand 3, the original being conveyed through a gap defined between the original glass stand 3 and the upper original conveyance guide 24 to thereby read the image.

FIG. 1A is an enlarged view showing a first reading point 25 for reading one side of a flowing original by the first optical carriage 4 in the flowing original reading method. Numeral 26 indicates a second optical carriage provided at a position on the opposite side of the first optical carriage 4 with the original interposed therebetween and serving as a second reading means dedicated to the flowing original reading method. Inside the second optical carriage 26, there are provided a reflection mirror 32, a CCD 33, a lamp 34, and so on, which are similar to those of the first optical carriage 4.

FIG. 1B is an enlarged view showing a second reading point 27 for reading the image on one side of a flowing original by the second optical carriage 26 in the flowing original reading method. Numeral 43 indicates a second light transmitting member which guides the movement of the original.

Numeral 28 indicates a delivery roller pair for delivering an original outside the apparatus, and numeral 29 indicates a delivery tray which is provided outside and on a side surface of the FB 1 and on which the originals delivered by the delivery roller pair are stacked.

Figure 2:
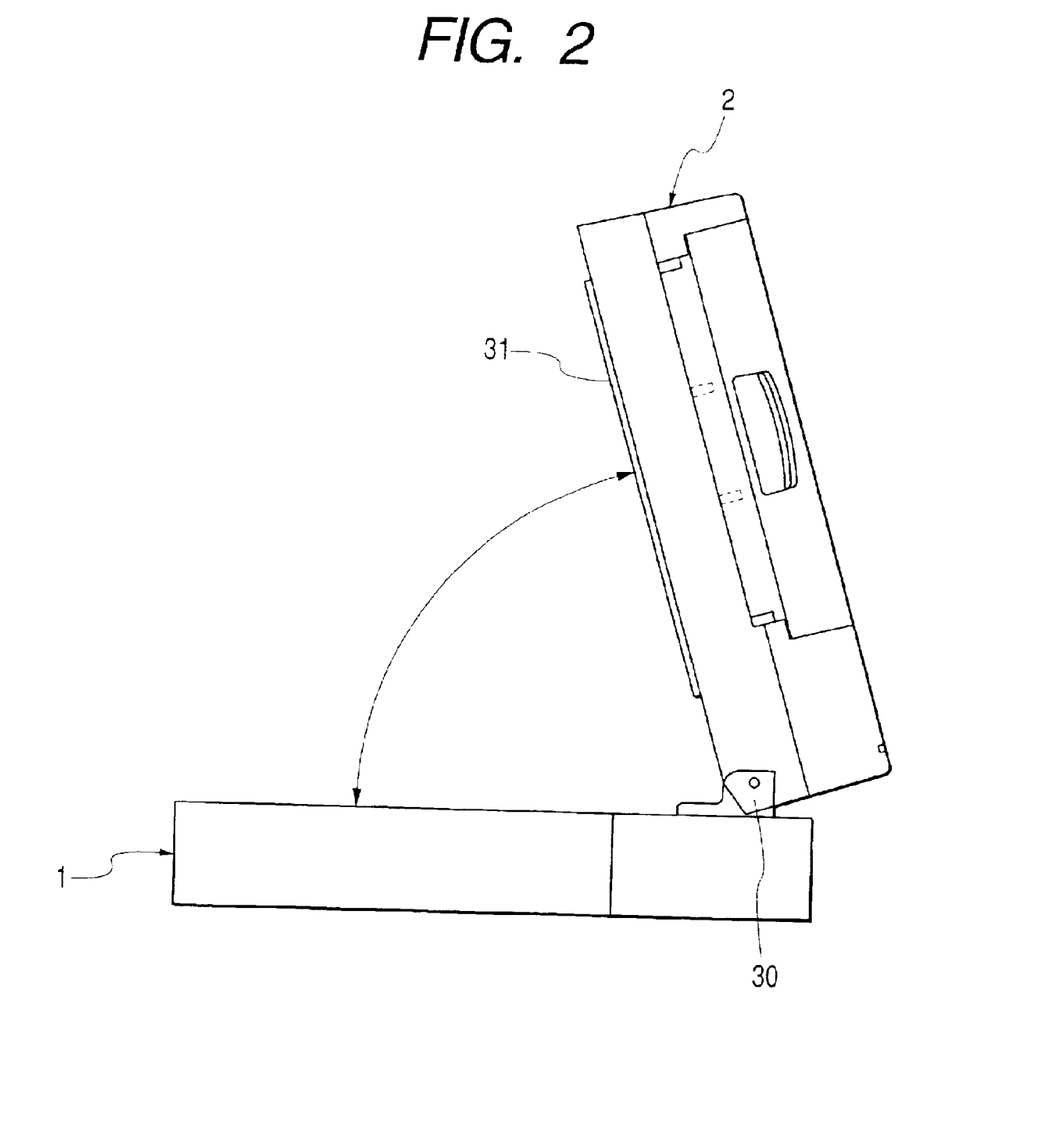
FIG. 2 is a diagram showing an ADF in an open state.

FIG. 2 shows the ADF 2 in the open state. In FIG. 2, numeral 30 indicates a hinge for rotatably connecting the ADF 2 with the FB 1, and numeral 31 indicates a pressure plate for pressing the original on the original glass stand 3 against the original glass stand 3.

Figure 3A:
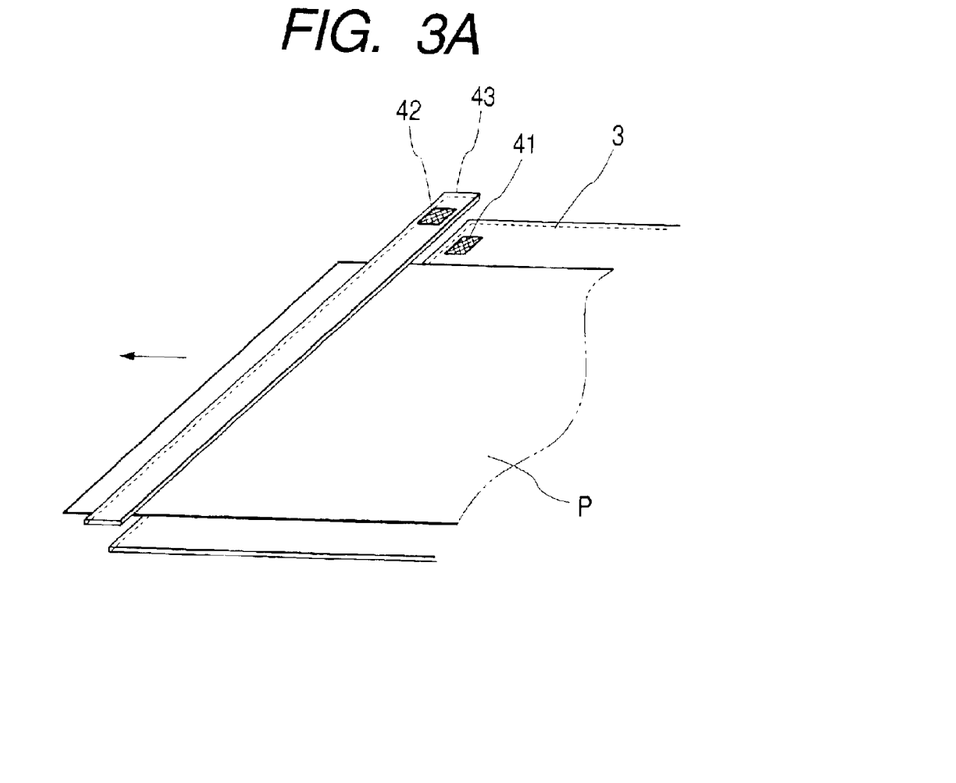
FIG. 3A is a perspective view showing a light transmitting member provided with a standard portion according to the embodiment.
Figure 3B:
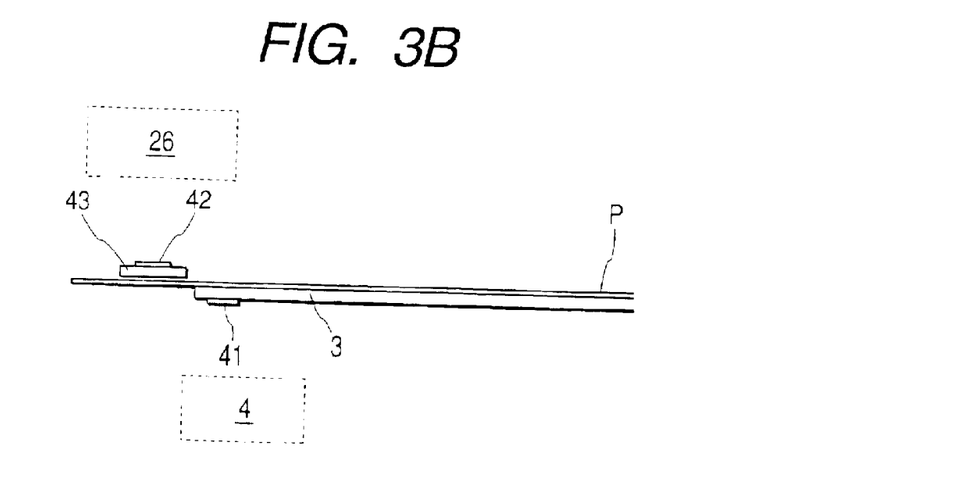
FIG. 3B is a side view of FIG. 3A.

FIG. 3A is a perspective view showing the construction of the standard white plates provided on the original glass stands and serving as the standard portions for shading compensation, and FIG. 3B is a side view of the same. A first standard white plate 41, which is used as the standard white in the sub-scanning direction for the original P at the time of flow-reading by the first optical carriage 4, is provided on the back side of the original glass stand 3, i.e., on the back side thereof opposite to a side on which the original is conveyed. A second standard white plate 42, which is used as the standard white in the sub-scanning direction of the original P at the time of flow-reading by the second optical carriage 26, is provided on the back side of an original glass stand 43, serving as a light transmitting member arranged between the second optical carriage 26 and the original P, i.e., on the back side of the original glass stand 43 opposite to a side on which the original is conveyed.

That is, the standard white plate 41 is provided on the side of the original glass stand 3 on which the first optical carriage 4 is arranged, and the standard white plate 42 is provided on the side of the original glass stand 43 on which the second optical carriage 26 is arranged.

Further, the standard white plates 41 and 42 are arranged outside the original image readable area in the direction perpendicular to the direction in which the original is conveyed. This prevents the original image readable area and the standard whites from overlapping each other within the read image.

Figure 4:
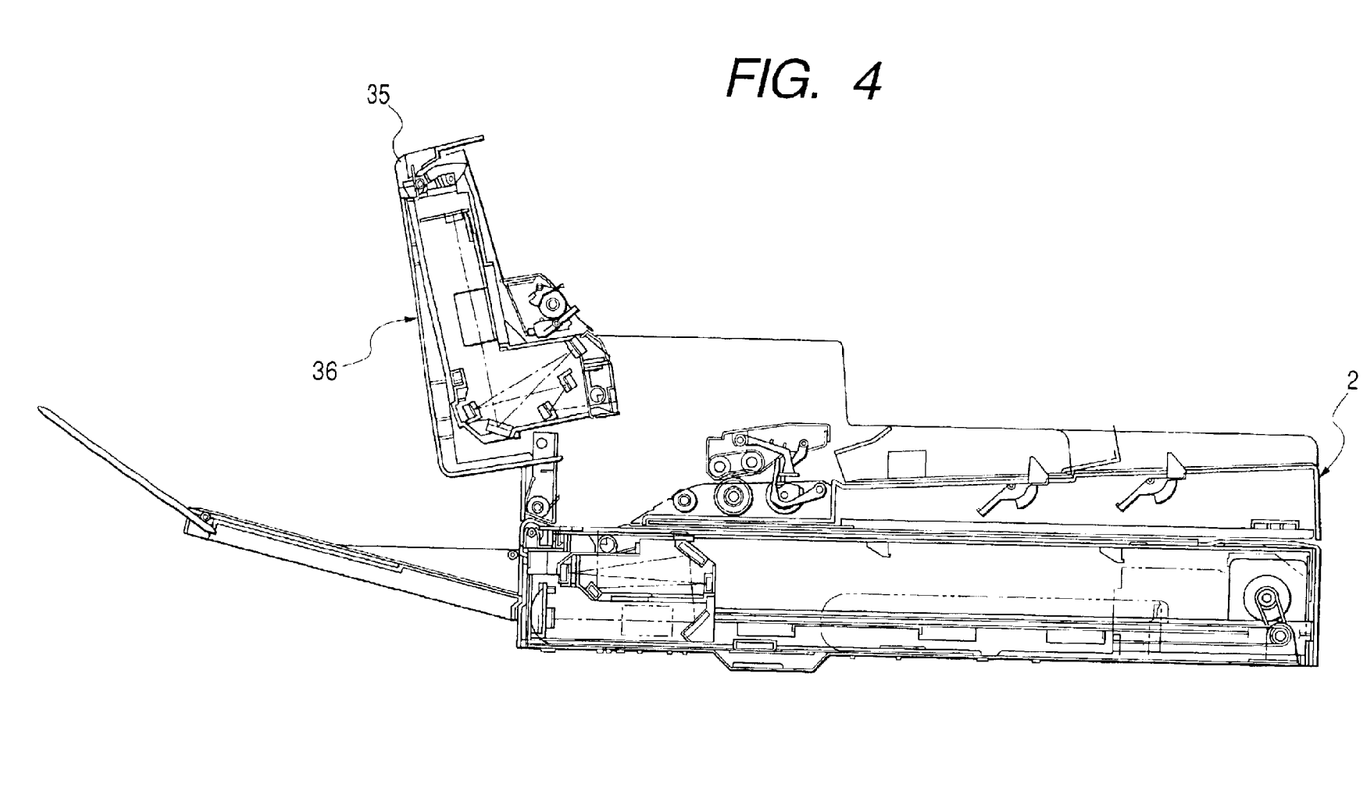
FIG. 4 is a diagram showing a paper jam clearance opening/closing portion of the ADF in an open state.

FIG. 4 shows a state in which the ADF 2 is left open to perform jam clearance. Numeral 35 indicates a jam clearance lever, and numeral 36 indicates a jam clearance opening/closing portion of the ADF 2, which is opened when clearing away a jammed original.

Figure 5A:
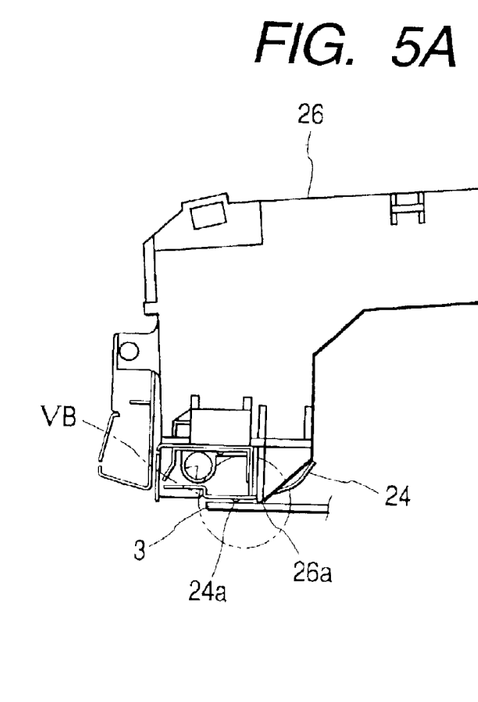
FIG. 5A is a diagram showing a second reading means.
Figure 5B:
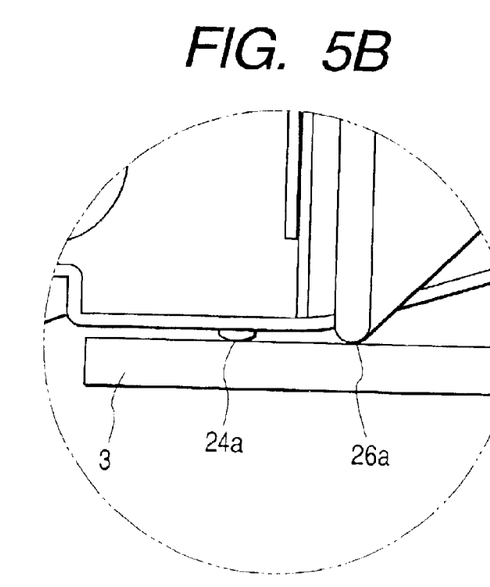
FIG. 5B is an enlarged view of the encircled portion VB of FIG. 5A.

As shown in FIGS. 5A and 5B, a protrusion 26a of the second optical carriage 26 abuts the original glass stand 3, whereby the positioning of the second optical carriage 26 in the height direction can be effected with very high accuracy with respect to the original glass stand 3.

Further, the upper original conveyance guide 24 is connected so as to be swingable with respect to the second optical carriage 26, thereby enabling the original to be easily guided with respect to the second optical carriage 26. At the same time, a protrusion 24a, which is a part of the upper original conveyance guide 24, abuts the original glass stand 3, whereby positioning can be effected while accurately securing the original conveyance position and the original conveyance path.

The operation of the apparatus, constructed as described above, will now be described.

First, the stationary original reading method executed by the FB 1 will be described. When performing stationary original reading by the FB 1, the ADF 2 is opened, and the original is placed on the original glass stand 3. The original is set in position by causing the original to abut the original abutment reference plate 11. Next, by closing the ADF 2, the original is pressed against the original glass stand 3 by the pressure plate 31, whereby curling, etc. of the original is corrected, and the original is brought into close contact with the original glass stand 3.

After this, the operator depresses an original reading start button (not shown) to thereby start the reading of the original. First, the drive belt 5 is driven by the driving motor 6 to cause the first optical carriage 4 to move to the carriage home position.

Next, to perform initialization in the main scanning direction, the first optical carriage 4 is moved to the standard white plate 41 provided on the back side (the first optical carriage 4 side) of the original glass stand 3 to read the standard white, whereby correction of the lamp 7 and the CCD 9 is executed.

After this, the first optical carriage 4 is moved to the reading start position, and is accelerated as it moves from the reading start position to the original reading position. After the first optical carriage 4 has attained a predetermined speed, the first optical carriage 4 reaches the original leading end position of the original abutment reference plate 11.

Thereafter, the first optical carriage 4 reads the original as the first optical carriage 4 is moved at the predetermined speed.

When the entire original has been read, the first optical carriage 4 is moved in the direction opposite to the reading direction by reversing the driving motor 6, and returns to a predetermined standby position.

Next, the flowing original reading method will be described. When performing a reading of flowing originals, the originals are placed on the original stacking tray 13 of the ADF 2. Due to the original length detecting lever 14 and the original presence/absence sensor lever 15, the ADF 2 can ascertain that the originals have been placed on the original stacking tray 13.

Further, it is possible to know the original size through a combination of the setting of the original width performed by the operator by using the original side regulating plate 12 and the detection effected by the original length detecting lever 14.

When in the above-described condition the operator depresses an original reading start button (not shown), the original shutter 17, which has regulated the original leading end, is released, and the stacked originals are conveyed to the original separating and feeding portion by the weight 16 and the pickup roller 18. And, the stacked originals are fed one by one by the separating belt 19 and the feeding roller 20.

After the leading end of the original separated and fed has reached the registration roller pair 22, and a predetermined loop has been formed by the ante-registration sensor lever 21, the rotation of the feeding roller 20 is stopped. After a predetermined time interval, the registration roller pair 22 starts to rotate to convey the original.

The leading end of the original conveyed is detected by the original leading end detecting lever 23, and the requisite time for the original to reach the original reading position is determined. The original is guided to the first reading point 25, where image reading is performed by the first optical carriage 4, by the upper original conveyance guide 24.

Simultaneously with the conveyance of the original, the following initializing operations are respectively conducted by the first optical carriage 4 and the second optical carriage 26. The first optical carriage 4 is designated when the original is conveyed and read in the ADF 2. After the operator depresses the original reading start button, shading compensation is effected before the original reaches the first reading point 25.

The operation of the first optical carriage 4 will be described specifically. The first optical carriage 4 lights the lamp 7 and moves to the first reading point 25. And, the standard white plate 41 provided on the back side of the original glass stand 3 at the first reading point 25 is read so that standard white compensation (shading compensation) is effected. After this, the first optical carriage 4 waits for the arrival of the original at the first reading point 25.

Like the first optical carriage 4, the second optical carriage 26 lights the lamp 34 therein before the original reaches the second reading point 27, and reads the standard white plate 42 provided on the back side of the original glass stand 43 at the second reading point 27 so that standard white compensation (shading compensation) is effected.

After the execution of the shading compensation described above, the original reaches the first reading point 25, and, as the original is conveyed at a predetermined conveying speed, the image on one side of the original is successively read. Further, the original is conveyed to the second reading point 27, where the image on the other side of the original is successively read by the second optical carriage 26.

After passing the second reading point 27, the leading end of the original is conveyed by the delivery roller pair 28, and, after all the images of the original have been read, the original is delivered onto the delivery tray 29.

Through the above series of operations, the original is read by the ADF 2.

FIG. 4 illustrates the jam clearance operation to be performed when the original is jammed in the ADF 2. When original jamming occurs in the ADF 2, it is detected by the ante-registration sensor lever 21 and the original leading end detecting lever 23. When the original jamming is detected, the original conveyance in the ADF 2 is stopped, and the operator is informed of the occurrence of the original jamming. The operator operates the jam clearance lever 35 to open the jam clearance opening/closing portion 36 of the ADF 2 as shown in FIG. 4. In this condition, the jammed original is easily cleared away.

At this time, by opening the jam clearance opening/closing portion 36, the second optical carriage 26 is also rotated around a predetermined rotation center to be thereby opened. After the operator has conducted jam clearance processing, the jam clearance opening/closing portion 36 is closed. At this time, the protrusion 26a constituting a part of the second optical carriage 26 abuts the original glass stand 3, whereby the positioning of the second optical carriage 26 is accurately effected with respect to the height direction. At the same time, the protrusion 24a constituting a part of the original conveyance upper guide 24 abuts against the original glass stand 3, thereby reliably securing the original conveyance path.

In the image reading apparatus, constructed as described above, the standard white plate 41 is provided on the side of the original glass stand 3 on which the first optical carriage 4 is arranged, and the white standard plate 42 is provided on the side of the original glass stand 43 on which the second optical carriage 26 is arranged, whereby it is possible to prevent soiling of the standard white plates 41 and 42 as a result of the original coming into contact with the standard white plates 41 and 42 during the conveyance of the original, soiling of the standard white plates 41 and 42 as a result of the operator touching the standard white plates 41 and 42, soiling of the standard white plates 41 and 42 with passage of time, etc., which has been a problem in the conventional art.

That is, the original does not come into contact with the standard white plates 41 and 42 during the conveyance of the original, so that there is no danger of the standard white plates 41 and 42 being soiled as a result of the conveyance of the original. Further, since the user cannot touch the standard white plates 41 and 42, there is no danger of the user inadvertently soiling the standard white plates 41 and 42. Further, the sides of the original glass stands 3 and 43 on which the first optical carriage 4 and the second optical carriage 26 are arranged are inside the apparatus and they are free from contact with external objects, so that there is no danger of the standard white plates 41 and 43 being soiled with passage of time.

Thus, there is no need to perform maintenance on the standard white plates 41 and 42, which can always maintain a stable standard white with ease.

(Second Embodiment)

Figure 6:
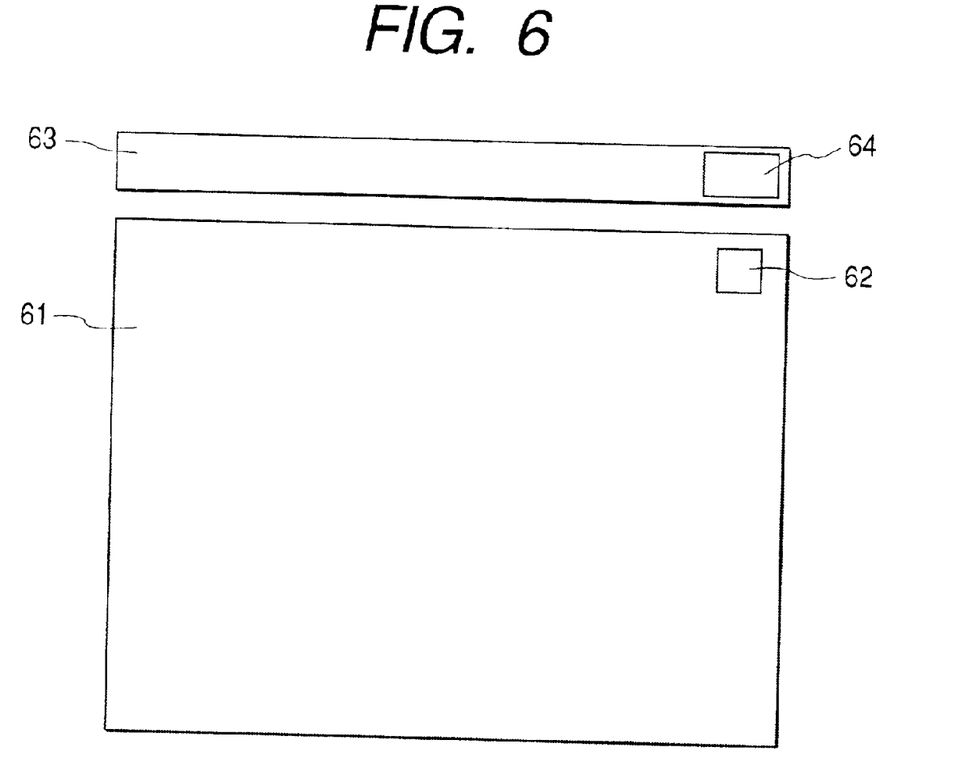
FIG. 6 is a diagram showing a light transmitting member provided with a standard portion according to another embodiment.

FIG. 6 shows a second embodiment, whose construction will be described below. Here, a description of the image reading apparatus will be omitted since it has been described with reference to the first embodiment. Thus, only the features of the second embodiment will be described.

Numeral 61 indicates a platen glass plate which constitutes a first light transmitting member on a lower image reading portion serving as a first reading means (which corresponds to the FB 1 of the first embodiment), numeral 62 indicates a standard white plate serving as a first standard portion, numeral 63 indicates a platen glass plate which constitutes a second light transmitting member on an upper image reading portion serving as a second reading means (which corresponds to the ADF 2 of the first embodiment), and numeral 64 indicates a standard white plate serving as a second standard portion.

The standard white plates 62 and 64 are respectively provided on the sides of the platen glass plates 61 and 63 on which the optical carriages are arranged.

In the lower image reading portion, the lateral registration position in the image processing region of the read original image is stationary, and, in the upper image reading portion, the reading start position can be adjusted in the original widthwise direction so that the image processing region of the image to be read in the upper image reading portion can be changed in accordance with the image processing region of the image to be read in the lower image reading portion after lateral registration adjustment.

This embodiment is characterized in that the width of the standard white plate 62 differs from the width of the standard white plate 64 in the original widthwise direction which is perpendicular to the original conveying direction; the standard white plate 62 is smaller than the standard white plate 64 in the original widthwise direction. This arrangement is adopted in order that the standard white plate 64 may allow for deviation due to the lateral registration adjustment of the read image of the upper image reading portion and that the position of the standard white in the image processing region of the read image of the upper image reading portion after the lateral registration adjustment may coincide with the position of the standard white in the image processing region of the read image of the lower image reading portion.

The standard white plates and the lateral registration adjustment in the above construction will be described. The reading region in the original width direction of the upper image reading portion allows lateral registration shift by a predetermined amount in the original widthwise direction which is perpendicular to the original conveying direction with respect to the reading region of the lower image reading portion. This arrangement is adopted in order to perform lateral registration adjustment of the front and back sides of the original when reading the original image. In the initial state, however, it is mechanically difficult to effect matching in lateral registration direction for the front and back sides.

In view of this, the images of the front and back sides of a sample original for lateral registration adjustment of the front and back sides are read, and the lateral registration of the image processing region of the read image of the upper image reading portion is shifted with respect to the image processing region of the read image of the lower image reading portion by an amount corresponding to the deviation amount and then output.

For the reading of the effective image area, there are provided the standard white plates 62 and 64 at the ends in the original widthwise direction. The standard white plate 64 of the upper image reading portion is larger than the standard image plate 62 of the lower image reading portion in order to allow for the deviation of the upper image reading portion with respect to the lower image reading portion corresponding to the lateral registration adjustment.

Due to this arrangement, the distance from the reading start position to the reading position of the standard white plate after the lateral registration adjustment can be made the same in both the upper and lower image reading portions, so that it is possible to set the standard white positions in the image processing regions to fixed positions in the image processing regions on the front and back sides.

As described above, in accordance with the present invention, there is no need to perform maintenance on the standard white plates, and the standard white plate can always maintain a stable standard white with ease.

The above-described embodiments of the present invention should not be construed restrictively. Various modifications are possible without departing from the technical scope of the present invention.

What is claimed is:

1. An image reading apparatus comprising:

a first light transmitting member to be opposed to an original;

first reading means for reading an image of the original through said first light transmitting member; and a first standard portion which is read by said first reading means to perform shading compensation;

a second light transmitting member to be opposed to an original;

second reading means for reading an image of the original through said second light transmitting member; and a second standard portion which is read by said second reading means to perform shading compensation, wherein said first light transmitting member, said first reading means, and said first standard portion are provided on a first side of the original, and wherein said second light transmitting member, said second reading means, and said second standard portion are provided on a second side, opposite to said first side, of the original, wherein said first reading means is able to read a stationary original and an original being conveyed, and wherein said second reading means reads an original being conveyed, and wherein a width of said second standard portion is larger than a width of said first standard portion in a direction perpendicular to a direction in which the original is conveyed.

2. An image reading apparatus according to claim 1, wherein said first light transmitting member supports the original.

3. An image reading apparatus according to claim 1, wherein said first and second light transmitting members guide movement of the original.

4. An image reading apparatus according to claim 1, wherein said first and second standard portions are provided outside an original image readable area.

5. An image reading apparatus according to claim 1, wherein said second light transmitting member, said second reading means, and said second standard portion are formed as a unit, said unit being movable relative to a main body of said image reading apparatus.

6. An image reading apparatus according to claim 1, wherein said first standard portion is provided on an opposite side to a side, to which the original is to face, of said first light transmitting member, and said second standard portion is provided on an opposite side to a side, to which the original is to face, of said second light transmitting member.

* * * * *